(12) United States Patent
Araki et al.

(10) Patent No.: US 8,901,214 B2
(45) Date of Patent: *Dec. 2, 2014

(54) FLAME-RETARDANT RESIN COMPOSITION

(75) Inventors: Yoshifumi Araki, Tokyo (JP); Takashi Sato, Tokyo (JP); Takahiro Hisasue, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 13/242,055

(22) Filed: Sep. 23, 2011

(65) Prior Publication Data

US 2012/0100371 A1    Apr. 26, 2012

Related U.S. Application Data

(63) Continuation of application No. 12/309,879, filed as application No. PCT/JP2007/064854 on Jul. 30, 2007.

(30) Foreign Application Priority Data

Aug. 3, 2006    (JP) ................... 2006-212645

(51) Int. Cl.
```
C08K 5/34      (2006.01)
C08K 5/53      (2006.01)
C08J 3/22      (2006.01)
C08L 9/06      (2006.01)
H01B 3/42      (2006.01)
C08L 53/02     (2006.01)
C08L 71/12     (2006.01)
C08K 5/00      (2006.01)
C08K 3/22      (2006.01)
C08K 5/5313    (2006.01)
C08L 25/06     (2006.01)
C08L 71/02     (2006.01)
```

(52) U.S. Cl.
CPC .............. *C08L 53/02* (2013.01); *C08K 5/0091* (2013.01); *C08J 3/226* (2013.01); *C08K 3/22* (2013.01); *C08L 9/06* (2013.01); *H01B 3/427* (2013.01); *C08L 53/025* (2013.01); *C08L 71/12* (2013.01); *C08K 5/5313* (2013.01); *C08L 25/06* (2013.01); *C08L 71/02* (2013.01)
USPC .......................................... 524/100; 524/133

(58) Field of Classification Search
USPC ........................................................ 524/100
See application file for complete search history.

(56) References Cited

U.S. PATENT DOCUMENTS

| | | | |
|---|---|---|---|
| 2,393,967 A | 2/1946 | Brubaker | |
| 4,772,657 A | 9/1988 | Akiyama et al. | |
| 5,130,340 A | 7/1992 | Allen et al. | |
| 6,093,760 A | 7/2000 | Nishihara et al. | |
| 6,194,496 B1 | 2/2001 | Weber et al. | |
| 6,255,371 B1 * | 7/2001 | Schlosser et al. | 524/100 |
| 7,205,346 B2 | 4/2007 | Harashina | |
| 7,259,200 B2 | 8/2007 | Bauer et al. | |
| 2004/0254270 A1 | 12/2004 | Harashina | |
| 2005/0075472 A1 | 4/2005 | Yeager et al. | |
| 2005/0234193 A1 | 10/2005 | Sasagawa et al. | |
| 2006/0106139 A1 * | 5/2006 | Kosaka et al. | 524/90 |
| 2006/0111484 A1 | 5/2006 | Fishburn | |
| 2006/0131050 A1 | 6/2006 | Mhetar et al. | |
| 2006/0135695 A1 | 6/2006 | Guo et al. | |
| 2006/0167143 A1 | 7/2006 | Borade et al. | |
| 2006/0226404 A1 | 10/2006 | Bauer et al. | |

FOREIGN PATENT DOCUMENTS

| | | |
|---|---|---|
| CN | 1599776 A | 3/2005 |
| DE | 19618741 A1 | 11/1997 |
| EP | 0257486 A1 | 3/1988 |
| EP | 1522551 A1 | 4/2005 |
| EP | 1710275 A1 | 10/2006 |
| JP | 59-059724 A | 4/1984 |
| JP | 63-108059 A | 5/1988 |
| JP | 63-301222 A | 12/1988 |
| JP | 02-276823 A | 11/1990 |
| JP | 07-224193 A | 8/1995 |
| JP | 08-073720 | 3/1996 |
| JP | 2001-072978 A | 3/2001 |
| JP | 2001-335699 A | 12/2001 |
| JP | 2002-284963 A | 10/2002 |

(Continued)

OTHER PUBLICATIONS

European Patent Application No. 11182866.1, Extended European Search Report dated Dec. 9, 2011.
European Patent Application No. 11182878.6, Extended European Search Report dated Dec. 9, 2011.
European Patent Application No. 11182886.9, Extended European Search Report dated Dec. 9, 2011.
European Patent Application No. 11182910.7, Extended European Search Report dated Dec. 9, 2011.
Hoerold et al. (1999) New Developments with Phosphorus-Based Flame Retardants for Engineering Plastic, Polyprolylene, and Thermoset Resins, Global Fire Safety Issues-Industries and Products, Fire Retardant Chemical Association, pp. 129-153.

(Continued)

*Primary Examiner* — Hui Chin
(74) *Attorney, Agent, or Firm* — Morgan, Lewis & Bockius LLP

(57) ABSTRACT

The present invention provides a resin composition that simultaneously (1) supports high productivities, (2) is resistant to bleed out by the flame retardant present in the composition, (3) is resistant to migration of its components to another resin, (4) exhibits a high flame retardancy, and (5) exhibits high flexibility. The resin composition includes components (A) a polyphenylene ether, (B) a hydrogenated copolymer, (C) a styrene resin and/or olefin resin, and (D) a metal phosphinate, wherein the component (B) includes (B1) a polymer block principally comprising an aromatic vinyl monomer unit, and (B2) a hydrogenated copolymer block principally comprising an aromatic vinyl monomer unit and a conjugated diene monomer unit, and a content of the aromatic vinyl monomer unit in the (B2) is 20 to 95% by weight, and a content of the aromatic vinyl monomer unit in the (B) is 35 to 80% by weight.

13 Claims, No Drawings

(56) References Cited

FOREIGN PATENT DOCUMENTS

| | | |
|---|---|---|
| JP | 2004-204194 A | 7/2004 |
| JP | 2006-225477 A | 8/2006 |
| WO | 03/046084 A1 | 6/2003 |
| WO | 2005/040279 A1 | 5/2005 |
| WO | 2005-097900 A1 | 10/2005 |
| WO | 2006/055732 A2 | 5/2006 |
| WO | 2006/065519 A1 | 6/2006 |
| WO | 2006/065540 A1 | 6/2006 |
| WO | 2006/070988 A1 | 7/2006 |

OTHER PUBLICATIONS

Walz, (2002) New Developments on Phosphorus Flame Retardants, Speciality Chemicals Magazine, www.specchemonline.com; pp. 23-25.

Deboysere et al. (2005) Hologen-Free Flame Retardants for Electronic Applications, OnBoard Technology, www.Onbord-Technology.com, pp. 20-22.

Kolthoff et al. (1946) Determination of Polystyrene in GR-S Rubber, J. Polymer Sci. 1:429-433.

Nishizawa (2002) Flame Retardant Technology of Polymeric Materials, CMC Publishing Co., Ltd. vol. 1, pp. 73, 196, 370, 371, 372.

Yoshida (2004) Leading Edge Ecomaterials, Japan Electric Cable Technology Center, Inc., pp. 31-32.

Hoerold et al. (1999) New Developments with Phosphorus-Based Flame Retardants for Engineering Plastic, Polyprolylene, and Thermoset Resins, Global Fire Safety Issues—Industries and Products, Fire Retardant Chemical Association, pp. 129-153.

Walz, (2002) New Developments in Phosphorus Flame Retardants, Speciality Chemicals Magazine, www.specchemonline.com; pp. 23-25.

Deboysere et al. (2005) Halogen-Free Flame Retardants for Electronic Applications, OnBoard Technology, www.Onbord-Technology.com, pp. 20-22.

Supplementary European Search Reported dated Aug. 5, 2010 from EP 07791546.

* cited by examiner

FLAME-RETARDANT RESIN COMPOSITION

RELATED APPLICATIONS

This application is a Continuation Application of U.S. application Ser. No. 12/309,879, filed May 6, 2009, which is a U.S. National Phase Application of International Application No. PCT/JP2007/064854, filed Jul. 30, 2007, which claims the benefit of Japanese Patent Application No. 2006-212645, filed Aug. 3, 2006, all of which are herein incorporated by reference in their entireties.

TECHNICAL FIELD

The present invention relates to a flame-retardant resin composition that can be used for a coating material for electric wire and cable, and the like.

BACKGROUND ART

There is a need for the coating material for an electric wire and cable that is halogen-free, inexpensive, that have a low specific gravity, that is flame retardant, heat resistant, and flexible, and that support high productivities. Non-Patent Document 1 and Patent Document 1 proposes flame-retardant resin compositions comprising polyphenylene ether, which is rigid, low fluidity, high dimensional stability, and high flame retardancy; and a hydrogenated copolymer, which is high flexibility, and easily extrusion molded, containing an aromatic vinyl monomer unit and a conjugated diene monomer unit; and a phosphorus flame retardant.

Among the proposed flame-retardant resin compositions, reducing a content of the polyphenylene ether in the composition is one tactic for responding to the requirements for flexibility and productivity for coating materials. However, the flame retardancy is reduced if the content of polyphenylene ether is reduced. On the other hand, if a total content of the flame retardant is increased in order to improve the flame retardancy, the problem arises of bleed out of the flame retardant in the resin composition with elapsed time.

In addition, when an electric wire or cable comes into contact with the housing or casing, which is made of ABS resin or polycarbonate, for a household electrical appliance or consumer electronics device, the flame retardant and/or plasticizer migrate into the housing or casing. This causes a defective appearance.

Regarding such the flame-retardant resin, various compositions have been proposed.

Patent Document 1 proposes a flame retardant comprising a mixture of ammonium phosphate, a metal hydroxide, and a phosphate ester. However, as described in Non-Patent Document 2, ammonium phosphate generally has a low heat resistance and a high hygroscopicity. Moreover, phosphate esters are prone to bleed out to the surface of the composition.

Patent Document 2 proposes a flame-retardant resin composition comprising 15 parts by weight or more but less than 45 parts by weight of polyphenylene ether, from 0 to 30 parts by weight of a styrene polymer, from 10 to 60 parts by weight of a hydrogenated copolymer containing a copolymer block obtained by a hydrogenation of a copolymer comprising a conjugated diene monomer unit and an aromatic vinyl monomer unit, and from 3 to 40 parts by weight of a phosphorus-type flame retardant selected from phosphorus red, phosphate esters, phosphazene compounds, and phosphoramide compounds. However, the compositions proposed as examples exhibit a low flexibility, a distinct tendency for bleed out to occur, and a distinct tendency for component migration to occur upon contact with another resin such as ABS.

Patent Document 3 discloses a flame-retardant resin composition that contains a phosphorus-containing compound, aromatic resin, a nitrogen-containing compound, a metal salt of an inorganic acid, and a compound having a functional group that is reactive with the active hydrogen atom or a water-repellent compound. However, there is no mention of a hydrogenated copolymer principally comprising an aromatic vinyl monomer unit and a conjugated diene monomer unit. Therefore, the productivity and the flexibility are inadequate.

Non-Patent Document 1: Leading Edge Ecomaterials by Takashi YOSHIDA, Japan Electric Cable Technology Center, Inc., p. 31 (2004)

Non-Patent Document 2: Flame Retardant Technology of Polymeric Materials Hitoshi NISHIZAWA by Hitoshi NISHIZAWA, CMC Publishing Co., Ltd. (2002)

Patent Document 1: International Publication No. 2005/097900

Patent Document 2: Japanese Patent Application Laid-open No. 2006-225477

Patent Document 3: International Publication No. 2003/046084

DISCLOSURE OF THE INVENTION

Problems to be Solved by the Invention

An object of the present invention is to provide a flame-retardant resin composition that simultaneously (1) supports high productivities, (2) is resistant to bleed out by the flame retardant present in the composition, (3) is resistant to migration of its components to another resin, such as ABS, (4) exhibits a high flame retardancy, and (5) exhibits high flexibility.

Means for Solving the Problems

The present inventors carried out extensive and intensive study in order to accomplish the object described above and aimed at the present invention as a result.

Namely, the present invention is as follows.

(1)

A resin composition, comprising components (A), (B), (C), and (D), wherein, based on a total content of components (A), (B), (C), and (D), a content (<A>) of the component (A), which is a polyphenylene ether, is 10% by weight or more but less than 45% by weight, a content (<B>) of the component (B), which is a hydrogenated copolymer principally comprising an aromatic vinyl monomer unit and a conjugated diene monomer unit, is 20% by weight or more, a content (<C>) of the component (C), which is a styrene resin and/or olefin resin, is 0% by weight or more, and a content (<D>) of the component (D), which is a metal phosphinate, is 2% by weight or more.

(2)

The resin composition according to (1), wherein the component (C) is a styrene resin and the content <C> is 3% by weight or more.

(3)

The resin composition according to (1) or (2), wherein the component (B) comprises (B1) a polymer block principally comprising an aromatic vinyl monomer unit and (B2) a hydrogenated copolymer block principally comprising an aromatic vinyl monomer unit and a conjugated diene monomer unit; and a content of the aromatic vinyl monomer unit in the (B2) is 20% by weight or more.

(4)

The resin composition according to any one of (1) to (3), wherein a content of the aromatic vinyl monomer unit in the component (B) is 35% by weight or more.

(5)

The resin composition according to any one of (1) to (4), wherein the content <A> of the component (A) content and the content <B> of the component (B) content satisfy the following formula.

$$<B>><A> \quad (1)$$

(6)

The resin composition according to any one of (1) to (4), wherein the content <A> of the component (A), and the content <B> of the component (B) satisfy the following formula.

$$<B>>1.5\times<A> \quad (2)$$

(7)

The resin composition according to any one of (1) to (6), wherein a Shore A hardness measured according to JIS K 6253 is 95° or less.

(8)

The resin composition according to any one of (1) to (7), that further comprises a nitrogen group-containing compound as a component (E) which is a phosphorus-based flame retardant other than metal phosphinate.

(9)

The resin composition according to (8), comprising a melamine polyphosphate as the component (E).

(10)

A coating material for electric wire and cable, comprising the resin composition according to any one of (1) to (9).

Advantage of the Invention

The flame-retardant resin composition of the present invention can simultaneously provide the following properties: the ability to support high productivities, resistance to bleed out by the flame retardant present in the composition, resistance to migration by its components into another resin (e.g., ABS), high flame retardancy, and high flexibility.

BEST MODE FOR CARRYING OUT THE INVENTION

The present invention relates to a resin composition comprising components (A), (B), (C), and (D).

A homopolymer or copolymer having the following general formula <a> and/or the following general formula <b> as a repeat unit or repeat units therein can be used as the component (A) of the present invention, which is a polyphenylene ether.

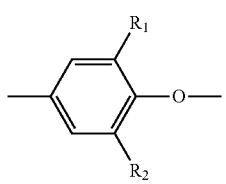
(a)

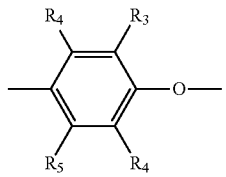
(b)

(wherein, $R_1$, $R_2$, $R_3$, $R_4$, $R_5$, and $R_6$ represent monovalent residues such as a $C_{1-4}$ alkyl group, aryl group, halogen, hydrogen and the like, wherein $R_5$ and $R_6$ are not simultaneously hydrogen.)

The typical examples of the polyphenylene ether homopolymer may include poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and the like.

Examples of the polyphenylene ether copolymer may include polyphenylene ether copolymers that are principally composed of the phenylene ether structure, such as copolymers of 2,6-dimethylphenol with 2,3,6-trimethylphenol or o-cresol, copolymers of 2,3,6-trimethylphenol with o-cresol, and the like.

In addition, to the extent not departing from the gist of the present invention, the polyphenylene ether may incorporate various other phenylene ether structures which is previously proposed for possible inclusion in polyphenylene ethers. Examples of such phenylene ether structures proposed for inclusion in small amounts may include the 2-(N-alkyl-N-phenylaminomethyl)-6-methylphenylene ether unit and 2-(dialkylaminomethyl)-6-methylphenylene ether unit described in Japanese Patent Application Laid-open No. S63-301222 and the like.

Also, the examples of the above copolymers may include a polyphenylene ether in which small amounts of diphenoquinone is bonded in the main chain. Moreover, the examples of the above copolymers may include a polyphenylene ether that has been modified by a compound having a carbon-carbon double bond, as described in Japanese Patent Application Laid-open Nos. H2-276823, S63-108059, S59-59724 and the like.

The examples of the above copolymers may include a copolymer obtained by grafting a styrene compound onto the aforementioned polyphenylene ethers. Examples of the above copolymers may include copolymers obtained by the graft polymerization of styrene, α-methylstyrene, vinyltoluene, chlorostyrene, and the like onto the polyphenylene ether.

In order to improve the resin composition's heat resistance and resistance to bleed out by the phosphorus-containing flame retardant, the polyphenylene ether may be modified by a modifying agent that contains a polar group. This modified polyphenylene ether refers to a polyphenylene ether that has been modified with at least one modifying agent having in its molecular structure at least one carbon-carbon double bond or triple bond and at least one carboxyl group, acid anhydride group, amino group, hydroxyl group, glycidyl group, or the like.

The number-average molecular weight of the polyphenylene ether is preferably 2000 or more from the standpoint of the flame retardancy and heat resistance, and is preferably 40000 or less from the standpoint of a productivity. The range of from 10000 to 40000 is more preferable, and the range of from 20000 to 30000 is still more preferable. Two or more species that have different number-average molecular weights may be mixed in order to improve, for example, the processability, as long as the number-average molecular weight of the mixture is in the aforementioned range.

The content <A> of the component (A), which is a polyphenylene ether, based on the total content of components (A), (B), (C), and (D), must be 10% by weight or more from the standpoints of the flame retardancy, the heat resistance, and the bleed out resistance. The content <A> must be less than 45% by weight from the standpoint of the productivity and the flexibility and low specific gravity. The range of from 15% by weight to 40% by weight is preferable, the range of from 15% by weight to 30% by weight is more preferable, and the range of from 15% by weight to 25% by weight is still more preferable. Weight reduction can be obtained when the specific gravity is low. As a result, the cost per volume may be reduced.

The hydrogenated copolymer principally comprising an aromatic vinyl monomer unit and a conjugated diene monomer unit in the component (B) is the hydrogenate of a copolymer that principally comprises an aromatic vinyl monomer unit and a conjugated diene monomer unit.

The term "principally comprising" used herein refers to 60% by weight or more. A content of the aromatic vinyl monomer unit and the conjugated diene monomer unit in the hydrogenated copolymer (B) is preferably 80% by weight or more, and more preferably 90% by weight or more.

The examples of the aromatic vinyl monomer may include a monomer such as styrene, p-methylstyrene, tert-butylstyrene, α-methylstyrene,1,1-diphenylethylene, and the like. Among these materials, styrene is preferable.

The examples of the conjugated diene monomer unit may include butadiene, isoprene, and the like. Among these materials, butadiene is preferable from the standpoint of the resistance to bleed out.

From the standpoint of the productivity, the hydrogenation ratio for this hydrogenated copolymer (B) is preferably 50% by mole or more of the double bonds in the conjugated diene, more preferably 70% by mole or more, still more preferably 85% by mole or more, and most preferably 95% by mole.

The weight-average molecular weight of the hydrogenated copolymer (B) is preferably $5 \times 10^4$ or more from the standpoint of the heat resistance, and is preferably $40 \times 10^4$ or less from the standpoint of the productivity and flexibility. The range from of $7 \times 10^4$ to $30 \times 10^4$ is more preferable and the range of from $12 \times 10^4$ to $25 \times 10^4$ is more preferable.

The aromatic vinyl monomer unit is preferably 35% by weight or more of the hydrogenated copolymer (B) from the standpoint of the flame retardancy, and is preferably 80% by weight or less from the standpoint of achieving a high flexibility and a high productivity. The range of from 40% by weight to 70% by weight is more preferable, and the range of from 50% by weight to 65% by weight is still more preferable.

From the standpoint of the flexibility of the electric wire or cable, the tan δ peak in dynamic viscoelastic measurement on the hydrogenated copolymer (B) is preferably present in the range from −30° C. to 30° C., and more preferably present in the range from −20° C. to 20° C.

The content <B> of the component (B), which is hydrogenated copolymer, based on the total content of components (A), (B), (C), and (D), must be 20% by weight or more for the purposes of the flexibility, productivity and low specific gravity. It is preferably 85% by weight or less from the standpoint of the flame retardancy, productivity, and resistance to bleed out. It is more preferably 30% by weight or more and 80% by weight or less, still more preferably 40% by weight and 70% by weight or less, and most preferably 50% by weight or more.

From the standpoint of the flexibility, productivity or low specific gravity, the relationship between the content <A> of polyphenylene ether and the content <B> of hydrogenated copolymer preferably satisfies <A><<B>. The relationship more preferably satisfies 1.5×<A><<B>, still more preferably satisfies 2×<A><<B>, and most preferably satisfies 2.5×<A><<B>.

The example of a method of producing the hydrogenated copolymer (B) may include a method of polymerizing styrene by using an organic lithium compound as a polymerization initiator in an inert hydrocarbon solvent, followed by copolymerizing styrene with butadiene. Furthermore, depending on the particular case, these steps are repeated, or an appropriate coupling agent is added to the polymerization system in a prescribed amount with reference to the organic lithium compound. As a result, an unhydrogenated copolymer is obtained.

Deactivation of the active species is brought about by the addition to the reaction solution of water, alcohol, acid or the like. Then, the unsaturated double bond in the conjugated diene is hydrogenated by a known method. The solution is, for example, steam stripped to separate the polymerization solvent and the hydrogenated copolymer (B) is obtained by drying.

A optionally selected oxidation inhibitor may be added to the hydrogenated copolymer (B).

Moreover, from the standpoint of the resistance to bleed out, heat resistance, and mechanical strength, the hydrogenated copolymer (B) preferably contains at least one polymer block (B1) principally comprising an aromatic vinyl monomer unit. The hydrogenated copolymer (B) more preferably contains at least two polymer blocks (B1).

Also, from the standpoint of the resistance to bleed out, heat resistance, and mechanical strength, a content of the polymer block (B1) in the hydrogenated copolymer (B) is preferably 5% by weight or more. The content of the polymer block (B1) is preferably 40% by weight or less from the standpoint of the flexibility and productivity. The range of from 10% by weight to 30% by weight is more preferable, and the range of from 10% by weight to 25% by weight is still more preferable.

The polymer block (B1) principally comprising an aromatic vinyl monomer unit refers to a polymer block that has a weight-average molecular weight of 2000 or more. The weight-average molecular weight of (B1) is preferably 4000 or more, from the standpoint of the resistance to bleed out, heat resistance, and mechanical strength exhibited by the resin composition, and is preferably no greater than 70000 from the perspective of the productivity and flexibility. The range of from 6000 to 50000 is more preferable, and the range of from 10000 to 20000 is still more preferable.

From the standpoint of the flexibility and flame retardancy, the hydrogenated copolymer (B) preferably contains a hydrogenated copolymer block (B2) obtained by the hydrogenation of an aromatic vinyl monomer unit/conjugated diene monomer unit copolymer block. A content of the copolymer block (B2) in the hydrogenated copolymer (B) is preferably 20% by weight or more. The content is more preferably 40% by weight or more, and still more preferably 60% by weight or more.

A content of the aromatic vinyl monomer unit in the hydrogenated copolymer block (B2) is preferably 20% by weight or more from the standpoint of the flame retardancy and flexibility, and is preferably 95% by weight or less from the standpoint of the flexibility. From 35% by weight to 90% by weight is more preferable, and from 45% by weight to 80% by weight is more preferable.

A method of producing the hydrogenated copolymer block (B2) portion may include, but not limited to, a method of copolymerization in which aromatic vinyl monomer and conjugated diene monomer are simultaneously added in an anionic polymerization.

The examples of preferred structures for the hydrogenated copolymer (B) may include structures represented by the following general formulas.

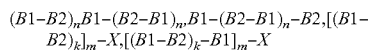

X represents the residue from a coupling agent such as silicon tetrachloride, tin tetrachloride, epoxidized soy oil, a polyhalogenated hydrocarbon compound, a carboxylate ester compound, a polyvinyl compound, a bisphenol-based epoxy compound, an alkoxysilane compound, a halogenated silane compound, an ester-based compound, and the like; or the residue from an initiator such as a multifunctional organolithium compound. n, k, and m are each integers with values of 1 or more, and generally are from 1 to 5. Any structures represented by the above-mentioned general formulas may also be used in combination.

A hydrogenated block principally comprising a conjugated diene monomer unit may also be present in the hydrogenated copolymer (B) in order to improve the flexibility and the like.

A distribution of the aromatic vinyl monomer unit in the hydrogenated copolymer block (B2) in the above general formulas is not particularly limited and may be random, uniform, tapered, or stepped. The copolymer block (B2) may also contain a plurality of regions in which the aromatic vinyl monomer unit is uniformly distributed and/or a plurality of regions in which the aromatic vinyl monomer unit is present in a tapered distribution. The hydrogenated copolymer block (B2) may also contain a plurality of segments that have different aromatic vinyl monomer unit contents. There is no particular limitation on the distribution of the conjugated diene compound-derived double bonds that have not undergone hydrogenation.

A styrene resin and/or an olefin resin can be added as component (C) in order to improve the heat resistance, productivity, or economics, as needs arises.

The styrene resin refers to a polymer obtained by the polymerization, in the presence or absence of a rubbery polymer, of a styrene compound and possibly a compound that is copolymerizable with the styrene compound.

The styrene compound refers to a compound represented by the following general formula (c).

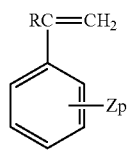

(wherein, R represents hydrogen, lower alkyl, or halogen; Z is selected from the group consisting of vinyl, hydrogen, halogen, and lower alkyl; and p is an integer from 0 to 5).

The examples of the styrene compound may include styrene, α-methylstyrene, 2,4-dimethylstyrene, monochlorostyrene, p-methylstyrene, p-tert-butylstyrene, ethylstyrene, and the like. The examples of the compound copolymerizable with the styrene compound may include methacrylate esters such as methyl methacrylate, ethyl methacrylate, and the like; unsaturated nitrile compounds such as acrylonitrile, methacrylonitrile, and the like; and acid anhydrides such as maleic anhydride and the like.

The examples of the rubbery polymer may include conjugated diene-based rubbers, conjugated diene/aromatic vinyl compound copolymers and their hydrogenates, ethylene-propylene copolymer-based rubbers, and the like. The preferable examples of the styrene resins for the present invention may include polystyrene and rubber-reinforced polystyrene.

The olefin resin is a known olefin resin. The examples thereof may include a homopolymer of an olefinic monomer such as polyethylene, polypropylene, polybutylene, polyisobutylene, and the like; and an ethylene-propylene-type copolymer, or a copolymer that contains olefinic monomer such as ethylene-ethyl acrylate copolymer and the like.

Preferable olefin resins are low-crystallinity polypropylenes and ethylene-propylene-type copolymers.

The styrene resin and/or the olefin resin may be a liquid component at an ambient temperature.

A content <C> of the styrene resin and/or the olefin resin (C), based on the total content of components (A), (B), (C), and (D), is preferably 3% by weight or more from the standpoint of the productivity, and is preferably 40% by weight or less from the standpoint of the flame retardancy. The content <C> is preferably 5% by weight or more and 30% by weight or less, more preferably 8% by weight or more and 30% by weight or less.

The metal phosphinate (D) refers to phosphinate salts represented by the following formula (I) and diphosphinate salts represented by the following formula (II).

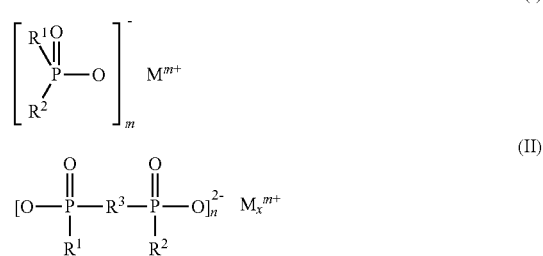

(wherein, $R^1$ and $R^2$ represent straight-chain or branched $C_{1-6}$ alkyl and/or aryl, and may be the same or different from each other;

$R^3$ represents straight-chain or branched $C_{1-10}$ alkylene, $C_{6-10}$ arylene, -alkylarylene, or -arylalkylene;

M represents Mg, Ca, Al, Sb, Sn, Ge, Ti, Fe, Zr, Ce, Bi, Sr, Mn, Li, Na, K, and/or a protonated nitrogenous base;

m is from 1 to 4;

n is from 1 to 4; and x is from 1 to 4.)

Preferred among the preceding from the standpoint of ease of acquisition is any one selected from the group consisting of the zinc salt, aluminum salt, titanium salt, zirconium salt, and iron salt. The aluminum salt is more preferable from the standpoint of availability.

An auxiliary agent may be added to a aggregate and/or primary particles of the metal phosphinate (D); the auxiliary agent is a polymer or copolymer based on vinylpyrrolidone, vinyl acetate, or vinylcaprolactam, or a mixture thereof, and/ or a polymer or copolymer based on epoxide, urethane, acrylate, ester, amide, stearate, olefin, a cellulose derivative, or a mixture thereof.

An average particle size of the metal phosphinate (D) is preferably 0.2 µm or more from the standpoint of the handling characteristics, and is preferably 50 µm or less from the standpoint of the flame retardancy and the smoothness of the product surface. The average particle size is preferably 0.5 µm or more but 40 µm or less, more preferably 1 µm or more but 10 µm or less.

A content <D> of the metal phosphinate (D), based on the total content of components (A), (B), (C), and (D), must be 2% by weight or more from the standpoint of the flame retardancy. Meanwhile, 20% by weight or less is preferable from the standpoint of the flexibility and productivity. The range of from 3% by weight to 15% by weight is more preferable, and the range of from 4% by weight to 10% by weight is still more preferable.

The resin composition of the present invention may also comprise a phosphorus-based flame retardant other than non-metal-phosphinate (E) for the purpose of cost reduction or flame retardancy and productivity. A content of the phosphorus-based flame retardant other than metal phosphinate (E), based on the total quantity of components (A), (B), (C), (D), and (E), is preferably 2% by weight or more but is preferably 25% by weight or less from the standpoint of the resistance to bleed out. The range of from 2% by weight to 10% by weight is more preferable and the range of from 2% by weight to 5% by weight is still more preferable.

The examples of the phosphorus-type flame retardant other than non-metal-phosphinate (E) may include phosphoramide compounds such as red phosphorus, phosphate esters, and the like; and compounds that contain the triazine ring and the like.

Among the nitrogen group-containing compounds, it is most preferable to use triazine ring-containing melamine polyphosphate from the standpoint of the flame retardancy.

Melamine polyphosphate is formed from melamine and phosphoric acid. The examples may include a cyclic polymetaphosphoric acid which is known as condensed phosphoric acids; and the equimolar addition salt between melamine and a straight-chain polyphosphoric acid. A degree of condensation n in these polyphosphoric acids is not particularly limited, and is generally in the range of from 3 to 50 and typically is from 5 to 30.

From the standpoint of the flame retardancy and dispersibility, a particle size of the melamine polyphosphate is preferably 0.5 µm or more but 40 µm or less.

The examples of the phosphate ester may include triphenyl phosphate, phenyl bisdodecyl phosphate, phenyl bisneopentyl phosphate, phenyl bis(3,5,5'-trimethylhexyl phosphate), ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, di(dodecyl) p-tolyl phosphate, tricresyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, bisphenol A bis(diphenyl phosphate), diphenyl (3-hydroxyphenyl) phosphate, bisphenol A bis(dicresyl phosphate), resorcinol bis(diphenyl phosphate), resorcinol bis(dixylenyl phosphate), 2-naphthyl diphenyl phosphate, 1-naphthyl diphenyl phosphate, di(2-naphthyl) phenyl phosphate, and the like.

Among the preceding, the following are preferable from the standpoint of the productivity, volatility, and heat resistance: triphenyl phosphate and resorcinol- or bisphenol A-based phosphate ester compounds, such as a phosphate ester compound principally composed of bisphenol A bis (diphenyl phosphate) (CR741 manufactured by Daihachi Chemical Industry Co., Ltd.) and a phosphate ester compound principally composed of resorcinol bis(dixylenyl phosphate) (PX200 manufactured by Daihachi Chemical Industry Co., Ltd.).

From the standpoint of the productivity, flexibility, flame retardancy, and low specific gravity, the total content of components (A), (B), (C), and (D) in the resin composition of the present invention is preferably 65% by weight or more of the resin composition. The total content is more preferably 75% by weight or more, still more preferably 85% by weight or more; and still more preferably 90% by weight.

Other components can be a flame retardant auxiliary, vide infra, and other additives as described below.

The resin composition of the present invention may comprise a flame retardant auxiliary agent in the form of a known drip inhibitor, which is present preferably in the range of from 0.1% by weight to 5% by weight in the composition and more preferably in the range of from 0.3% by weight to 3% by weight, as needs arises.

Preferable examples of the drip inhibitor may include drip inhibitors that form a fibrillar structure in the polyphenylene ether, as represented by polytetrafluoroethylene (PTFE).

Among PTFEs, the following highly dispersible PTFEs are preferable because they impart a good surface appearance to moldings made from modified polyphenylene ether: PTFE prepared by the emulsification and dispersion of PTFE in a solvent such as water; PTFE prepared by encapsulating PTFE with an acrylate ester resin, a methacrylate ester resin, a styrene-acrylonitrile copolymer resin, and the like. When the PTFE has been emulsified and dispersed in a solvent such as water, the PTFE preferably has an average particle size which is, but not limited to, preferably 1 µm or more and particularly preferably 0.5 µm or less The examples of commercially available products for the PTFE may include Teflon (registered trademark) 30J (manufactured by Mitsui-DuPont Fluorochemical Co., Ltd.), Polyflon (registered trademark) D-2C (manufacture by Daikin Industries, Ltd.), and Aflon (registered trademark) AD1 (manufactured by Asahi Glass Co., Ltd.), and the like.

These polytetrafluoroethylene can also be produced by known methods (refer to U.S. Pat. No. 2,393,967). In specific terms, the polymerization of tetrafluoroethylene can be carried out at a temperature of from 0° C. to 200° C. and preferably from 20° C. to 100° C. under a pressure of from 0.7 MPa to 7 MPa in an aqueous solvent using a free-radical catalyst such as sodium peroxydisulfate, potassium, or ammonium. This enables polytetrafluoroethylene to be obtained as a white solid.

The polytetrafluoroethylene desirably has a molecular weight of $10 \times 10^4$ or more, and preferably of approximately from $20 \times 10^4$ to $300 \times 10^4$. This results in an inhibition of dripping when the polytetrafluoroethylene-containing resin composition undergoes burning. In addition, the combination use of polytetrafluoroethylene and a silicone resin enables an even better inhibition of dripping and a shorter burning time than for the addition of only polytetrafluoroethylene.

A thermoplastic resin such as polyamide, polyester, polycarbonate, and the like, and other additives may also be incorporated on an optional basis.

The examples of available other additives include, but not limited to, additives that is typically incorporated into blends of rubbery polymers. For example, the additives described in "Chemicals for Incorporation in Rubbers and Plastics" (edited by the Rubber Digest Co.) can also be used. The examples thereof may include hydrocarbon oils (naphthenic oils, paraffinic oils, and the like), liquid conjugated dienes, liquid acrylonitrile-butadiene copolymers, liquid styrene-butadiene copolymers, liquid polybutenes, sebacate esters, and phthalate esters;

metal oxide pigments such as iron oxides and the like;

lubricants such as stearic acid, behenic acid, zinc stearate, calcium stearate, magnesium stearate, ethylenebisstearamide, and the like;

release agents;

organopolysiloxanes;

oxidation inhibitors such as hindered phenol-based oxidation inhibitors and phosphorus-based heat stabilizers;

hindered amine-based photostabilizers;

benzotriazole-based ultraviolet absorbers, non-phosphorus flame retardants, flame retardant auxiliary agents, static inhibitors;

reinforcing agents such as organic fibers, glass fibers, carbon black, and carbon fibers; reinforces, such as metal whisker; and colorants.

An addition of a hydrocarbon oil is preferable from the standpoint of productivity.

These additives may be used in combination.

A proportion of each component in the resin composition can be determined by dissolving the resin composition in chloroform, fractionating on a polar column (silica gel), and measurement by nuclear magnetic resonance spectroscopy.

The resin composition of the present invention is useful in particular in applications that require flexibility. A Shore A hardness thereof is used as a indicator for flexibility. The value measured according to JIS K 6253 is preferably 95° or less, more preferably 90° or less, and still more preferably 85° or less.

A strength at a 100% pull in tensile strength testing (JIS K 6251, sample thickness=2 mm, pull rate=500 cm/min) is preferably 300 kg/cm$^2$ or less. The strength is more preferably 150 kg/cm$^2$ or less, and still more preferably 90 kg/cm$^2$ or less. The hardness value can be reduced, for example, by increasing the content of the hydrogenated copolymer (B) principally comprising the aromatic vinyl monomer unit and the conjugated diene monomer unit in the resin composition, by increasing the content in the hydrogenated copolymer (B) of the conjugated diene monomer unit, or by adding a plasticizer.

There are no particular limitations on the method of producing the resin composition of the present invention, and known methods can be used to produce the composition of the present invention. For example, a melt mixing/kneading method can be used that employs a typical mixing device such as a Banbury mixer, single-screw extruder, twin-screw extruder, co-kneader, multiscrew extruder, and the like.

Due to a low fluidity of a polyphenylene ether, the styrene resin and/or olefin resin (C) is preferably mixed in advance with the polyphenylene ether (A) during production of the resin composition. The mixing of styrene resin is more preferable from the standpoint of the resistance to bleed out. The metal phosphinate (D) and/or the phosphorus-based flame retardant other than metal-phosphinate (E) may be added during mixing of the polyphenylene ether (A) with the styrene resin and/or olefin resin (C).

A masterbatch, which is prepared by a preliminary mixing/kneading of the metal phosphinate (D), the phosphorus-based flame retardant other than metal-phosphinate (E), pigment, and the like, may be used.

The resin composition of the present invention can be used in various applications where flame retardancy is required. For example, it can be suitably used for the coating material for electric wire and cable for household electrical components, automotive components, and the like; for the coating material for power cables, communication cables, electrical transmission cables, and the like; and as a construction material. Among these applications, the resin composition of the present invention is particularly suitable for use in fields such as coating materials for electric wires and cables.

This application is based on Japanese Patent Application Number 2006-212645 filed in Japan on Aug. 3, 2006, the subject matter of which is hereby incorporated herein by reference.

EXAMPLES

The present invention is described in more detail by way of the examples and comparative examples provided below. It should be noted, however, that the examples are presented for the illustration purpose only and should not be interpreted in any restrictive way.

(1) Evaluation of the Physical Properties of the Resins (1-1) Bonding Unit Content The amounts of the styrene monomer unit, 1,4-bonding unit from butadiene, 1,2-bonding unit from butadiene, ethylene unit, and butylene unit were measured by nuclear magnetic resonance spectroscopic analysis (NMR) using the following conditions.

measurement instrument: JNM-LA400 (product name, manufactured by JEOL)

solvent: deuterated chloroform sample concentration: 50 mg/mL measurement frequency: 400 MHz chemical shift standard: TMS (tetramethylsilane)

pulse delay: 2.904 s number of scans: 64 pulse width: 45° measurement temperature: 26° C.

(1-2) Content of the Styrene Polymer Block

The content of the styrene polymer block was measured by the osmium tetroxide analytical method described by I. M. Kolthoff et al., *J. Polym. Sci.* 1, 429 (1946) using the unhydrogenated copolymer. A tert-butanol solution of osmium tetroxide with a concentration of 0.1 g/125 mL was used in this analysis of the unhydrogenated copolymer.

(1-3) Weight-Average Molecular Weight and Molecular Weight Distribution

The weight-average molecular weight ($M_w$) and the number-average molecular weight ($M_n$), each as the polystyrene-based molecular weight, and the molecular weight distribution ($M_w/M_n$) were determined using the following conditions. instrument: LC-10 (product name, manufactured by Shimadzu Corporation)

column: 2×TSKgelGMHXL (inner diameter 4.6 mm×30 cm)

oven temperature: 40° C.

solvent: tetrahydrofuran (1.0 mL/min)

(1-4) Loss Tangent (tan δ) Peak Temperature

This was determined by measurement of the viscoelastic spectrum under the following conditions.

instrumentation: instrument for viscoelastic measurement and analysis (model DVE-V4 manufactured by the Rheology Co.)

strain: 0.1% frequency: 1 Hz (2) Preparation of the Flame-Retardant Resin Composition (2-1) The Polyphenylene Ether (A)

Polyphenylene ether: poly(2,6-dimethyl-1,4-phenylene) ether powder manufactured by Asahi Kasei Chemicals Corporation was used.

(2-2) Production of the (B) Hydrogenated Copolymer Principally Comprising an Aromatic Vinyl Monomer Unit and Conjugated Diene Monomer Unit (2-2-1) Preparation of the Hydrogenation Catalyst The following method was used to prepare the hydrogenation catalyst that was employed for the hydrogenation of the copolymer principally comprising an aromatic vinyl monomer unit and conjugated diene monomer unit.

One liter of purified and dried cyclohexane was introduced into a nitrogen-substituted reactor, 100 mmol biscyclopentadienyltitanium dichloride was added thereto, then an n-hexane solution containing 200 mmol trimethylaluminum was added thereto while thoroughly stirring; and a reaction was carried out for approximately 3 days at room temperature.

(2-2-2) Production of Hydrogenated Copolymer (1)

Batch polymerization was carried out using a jacketed and stirrer-equipped tank-type reactor with a capacity of 10 L. 6.4 L of cyclohexane and 150 g of styrene were first added thereto; N,N,N',N'-tetramethylethylenediamine (TMEDA) was preliminarily added so as to provide 0.35 time mole based on Li of undermentioned n-buthyllithium; and n-butyllithium was added so as to provide 13.0 mmol of Li. Polymerization was carried out at an initial temperature of 65° C., and, after the completion of polymerization, a cyclohexane solution (monomer concentration=22% by weight) containing 430 g of butadiene and 420 g of styrene was continuously added to the reactor at a constant rate over 60 minutes. After the completion of this polymerization, the copolymer was obtained by adding ethyl benzoate so as to provide 0.65 time mole based on Li of the n-butyllithium.

The content of styrene in the obtained copolymer was 57% by weight; the content of the polymer block principally comprising styrene in the copolymer was 15% by weight; the content of styrene in the hydrogenated copolymer block principally comprising styrene and butadiene was 49% by weight; and the 1,2-bonding unit was 22% of the butadiene.

The hydrogenation catalyst described above was added to the obtained copolymer at 100 ppm as titanium based on 100 parts by weight of the polymer and a hydrogenation reaction was carried out at a hydrogen pressure of 0.7 MPa and a temperature of 75° C. Octadecyl 3-(3,5-di-t-butyl-4-hydroxyphenyl)propionate was added as a stabilizer to the resulting polymer solution at 0.3 parts by mass based on 100 parts by mass of the hydrogenated copolymer.

The weight-average molecular weight of the obtained hydrogenated copolymer was $19\times10^4$ and the hydrogen addition ratio to the butadiene-originating double bonds present in the hydrogenated copolymer was 99%. In addition, the tan δ peak obtained by viscoelastic measurement was present at 0° C.

(2-2-3) Production of Hydrogenated Copolymer (2)

Batch polymerization was carried out using a jacketed and stirrer-equipped tank-type reactor with a capacity of 10 L. 6.4 L of cyclohexane and 80 g of styrene were first added; TMEDA was preliminarily added so as to provide 0.25 time mole based on Li of undermentioned n-buthyllithium; and n-butyllithium was added so as to provide 10 mmol of Li. Polymerization was carried out at an initial temperature of 65° C., and, after the completion of polymerization, a cyclohexane solution (monomer concentration=22% by weight) containing 490 g of butadiene and 360 g of styrene was continuously added to the reactor at a constant rate over 60 minutes. After the completion of this polymerization, the copolymer was obtained by adding a cyclohexane solution (monomer concentration=22% by weight) containing 70 g of styrene over 10 minutes.

The content of the styrene in the obtained copolymer was 51% by weight; the content of the polymer block principally comprising styrene in the copolymer was 15% by weight; the content of styrene in the hydrogenated copolymer block principally comprising styrene and butadiene was 42% by weight; and the 1,2-bonding unit was 22% of the butadiene.

The hydrogenation catalyst described above was added to the obtained copolymer at 100 ppm as titanium based on 100 parts by weight of the polymer and a hydrogenation reaction was carried out at a hydrogen pressure of 0.7 MPa and a temperature of 75° C. Octadecyl 3-(3,5-di-t-butyl-4-hydroxyphenyl)propionate was added as a stabilizer to the resulting polymer solution at 0.3 part by mass based on 100 parts by mass of the hydrogenated copolymer.

The weight-average molecular weight of the obtained hydrogenated copolymer was $16\times10^4$ and the hydrogen addition ratio to the butadiene-originating double bonds present in the hydrogenated copolymer was 99%. In addition, the tan δ peak obtained by viscoelastic measurement was present at −13° C.

(2-3) The Styrene Resin and/or Olefin Resin (C)

styrene resin: polystyrene (grade: PS1, product name, manufactured by Asahi Kasei)

olefin resin: polypropylene (grade: SA510, product name, manufactured by Japan Polyolefins)

(2-4) The Metal Phosphinate (D)

aluminum phosphinate (grade: Exolit OP930, product name, manufactured by Clariant)

(2-5) Component (E)

phosphate ester:

(E)-1: CR-733 (product name, resorcinol bis(diphenyl phosphate), manufactured by Daihachi Chemical Industry Co., Ltd.)

(E)-2: CR-741 (product name, bisphenol A bis(diphenyl phosphate), manufactured by Daihachi Chemical Industry Co., Ltd.)

melamine polyphosphate:

(E)-3: MELAPUR200/70 (product name, manufactured by Ciba Specialty Chemicals Corporation)

(2-6) Other plasticizer: Paraffin Oil PW90 (product name, manufactured by Idemitsu Chemical)

(3) Method of Producing the Resin Composition and Method of Producing Coated Wire The components shown in Table 1 were introduced in the proportions shown in Table 1; melt-mixing was carried out at 250 rpm at a mixing/kneading temperature of 260° C. using a twin-screw extruder (30 mmØ); and the resin composition was obtained as pellets.

Using the pellets thus obtained, a coated wire (copper wire with 1.2 mmØ, outer diameter=2 mmØ) was produced at a temperature of 280° C. and a linear velocity of 200 m/minute or 150 m/minute.

(4) Methods of evaluating the Practical Properties of the Resin Compositions (4-1) Extrusion Moldability The smoothness of the surface of the coated wire obtained according to (3) was visually evaluated.

<Evaluation Scale>

++: The surface of the coated wire produced at a linear velocity of 200 m/minute was very smooth and concave and convex were absent.

+: The surface of the coated wire produced at a linear velocity of 150 m/minute was very smooth and concave and convex were absent.

x: The surface of the coated wire produced at a linear velocity of 150 m/minute was rough and concave and convex were present.

(4-2) Resistance to Bleed Out

Samples were prepared by press molding (pressure=100 kg/cm², thickness=1 mm) the pellets obtained according to (3) and the surface of the molding was examined after the sample had stood for one week at 5° C., 20° C., and 40° C.

<Evaluation Scale>

+: The flame retardant did not bleed out at any temperature.

x: Bleed out occurred at least at one temperature.

(4-3) Resistance to Component Migration to Another Resin Such as ABS sample: a sample (2.5×50×thickness 2.0 mm) obtained according to (4-2) by press-molding the pellets The sample was stacked on an injection molding of ABS resin, and, after 48 hours at 60° C. under a load of 1 kg, the ABS surface of the contact area was visually examined.

<Evaluation Scale>

+: no changes in appearance x: in terms of appearance, a liquid component adhered on the ABS surface (4-4) Flame Retardancy sample: coated wire (copper wire with 1.2 mmØ, outer diameter=2 mmØ) obtained according to (3)

A VW-1 combustion test was carried out according to UL1581.

<Evaluation Scale>

++: the flame was extinguished within 30 seconds

+: the flame was extinguished within 60 seconds x: did not pass the VW-1 combustion test (4-5) Flexibility sample: a molding (thickness=2 mm) of the pellets obtained according to (3)

Tensile measurement (JIS K 6251, pull rate=500 cm/minute) was carried out on this sample as an indicator for the flexibility. The flexibility is good when the strength at a 100% pull is no greater than 350 kg/cm².

<Evaluation Scale>

++: The strength at a 100% pull is less than or equal to 100 kg/cm².

+: The strength at a 100% pull exceeds 100 kg/cm² but is less than or equal to 200 kg/cm².

Δ: The strength at a 100% pull exceeds 200 kg/cm² but is less than or equal to 350 kg/cm².

x: The strength at a 100% pull exceeds 350 kg/cm².

Examples 1 to 7 and Comparative Examples 1 to 4

The results of the evaluation testing are shown in Table 1 for Examples 1 to 7 and Comparative Examples 1 to 4.

It is shown that a high productivity, a high resistance to bleed out, a high resistance to component migration to ABS, a high flame retardancy, and a high flexibility can be achieved by the content <A> of the polyphenylene ether of at least 10% by weight but less than 45% by weight, the content <B> of the hydrogenated copolymer principally comprising aromatic vinyl monomer unit and conjugated diene monomer unit of 20% by weight or more, the content <C> of a styrene resin and/or olefin resin of 0% by weight or more, and the content <D> of the metal phosphinate of 2% by weight or more.

Among the preceding, it is shown that the flexibility and productivity, or the properties related to a low specific gravity, are increased when the amount of the hydrogenated copolymer (B) principally comprising aromatic vinyl monomer unit and conjugated diene monomer unit is more than 1.5-times the amount of the polyphenylene ether (A). It is also demonstrated that the combined use of the metal phosphinate (D) and melamine polyphosphate provides additional improvements in the flame retardancy.

TABLE 1

(unit: parts by Weight)

|   |   | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Ex. 7 |
|---|---|---|---|---|---|---|---|---|---|---|---|---|
| (A) | polyphenylene ether | 20 | 20 | 20 | 20 | 20 | 21 | 20 | 20 | 21 | 60 | 35 |
| (B) | hydrogenated copolymer (1) | 59 | 59 | 59 |   |   | 57 | 59 | 59 | 64 | 19 | 44 |
|   | hydrogenated copolymer (2) |   |   |   | 59 | 59 |   |   |   |   |   |   |
| (C) | polystyrene (PS1) | 10 | 10 | 5 | 10 | 10 | 11 | 10 | 10 | 10 | 10 | 10 |
|   | polypropylene (SA510) |   |   | 5 |   |   |   |   |   |   |   |   |
| (D) | aluminum phosphinate | 11 | 7 | 7 | 11 | 6 | 6 |   |   |   |   | 7 |
| (E)-1 | phosphate ester 1 (*1) |   | 4 | 4 |   |   |   | 11 |   | 5 | 11 | 4 |
| (E)-2 | phosphate ester 2 (*2) |   |   |   |   |   |   |   | 11 |   |   |   |
| (E)-3 | melamine polyphosphate (*3) |   |   |   |   | 5 | 5 |   |   |   |   |   |
|   | plasticizer (*4) |   |   |   |   |   |   |   | 5 | 4 |   |   |
|   | Shore A hardness | 82 | 79 | 78 | 78 | 76 | 76 | 77 | 85 | 79 | >95 | 90 |
|   | extrusion moldability | + | ++ | ++ | + | + | ++ | ++ | ++ | + | x | + |
|   | resistance to bleed out | + | + | + | + | + | + | x | x | + | + | + |
|   | resistance to component migration to ABS | + | + | + | + | + | + | x | x | x | + | + |
|   | flame retardancy | + | + | + | + | ++ | ++ | + | x | x | ++ | + |
|   | flexibility | + | + | + | ++ | ++ | ++ | + | x | + | x | Δ |

*1 (E)-1 CR-733 (product name, resorcinol bis(diphenyl phosphate), manufactured by Daihachi Chemical Industry Co., Ltd.)
*2 (E)-2 CR-741 (product name, bisphenol A bis(diphenyl phosphate), manufactured by Daihachi Chemical Industry Co., Ltd.)
*3 (E)-3 MELAPUR200/70 (product name, manufactured by Ciba Specialty Chemicals Corporation)
*4 Paraffin Oil PW90 (product name, manufactured by Idemitsu Chemical)

INDUSTRIAL APPLICABILITY

The flame-retardant resin composition of the present invention is well-adapted for use in the field of coating materials for electric wire and cable and the like.

We claim:

1. A resin composition, comprising components (A), (B), (C), and (D), wherein, based on a total content of components (A), (B), (C), and (D), a content (<A>) of the component (A), which is a polyphenylene ether, is 20% by weight or more but less than 21% by weight, a content (<B>) of the component (B), which is a hydrogenated copolymer principally comprising an aromatic vinyl monomer unit and a conjugated diene monomer unit, is 57% by weight or more but 59% by weight or less, a content (<C>) of the component (C), which is a styrene resin and/or olefin resin, is 0% by weight or more but 40% by weight or less, and a content (<D>) of the component (D), which is an aluminum phosphinate is 2% by weight or more but 15% by weight or less, and wherein the component (B) comprises (B1) a polymer block principally comprising an aromatic vinyl monomer unit, and (B2) a hydrogenated copolymer block principally comprising an aromatic vinyl monomer unit and a conjugated diene monomer unit; and a content of the aromatic vinyl monomer unit in the (B2) is 20% by weight or more and 95% by weight or less, and wherein the content of the aromatic vinyl monomer unit in the component (B) is 35% by weight or more and 80% by weight or less, and the ratio of the content (<B>) of the component (B) to the content (<A>) of the component (A) is from 2.71 to 2.95.

2. The resin composition according to claim 1, wherein the content of the aromatic vinyl monomer unit in the component (B2) is 35% by weight or more and 90% by weight or less.

3. The resin composition according to claim 1 or 2, further comprising a nitrogen group-containing compound as a component (E), which is a phosphorus-based flame retardant other than aluminum phosphinate.

4. The resin composition according to claim 3, comprising a melamine polyphosphate as the component (E).

5. A pellet of flame retardant resin composition obtained by melt-mixing a resin composition, comprising components (A), (B), (C) and (D), wherein, based on a total content of components (A), (B), (C) and (D), a content (<A>) of the component (A), which is a polyphenylene ether, is 20% by weight or more but less than 21% by weight, a content (<B>) of the component (B), which is a hydrogenated copolymer principally comprising an aromatic vinyl monomer unit and a conjugated diene monomer unit, is 57% by weight or more but 59% by weight or less, a content (<C>) of the component (C), which is a styrene resin and/or olefin resin, is 0% by weight or more but 40% by weight or less, and a content (<D>) of the component (D), which is an aluminum phosphinate is 2% by weight or more but 15% by weight or less;

wherein the component (B) comprises (B1) a polymer block principally comprising an aromatic vinyl monomer unit, and (B2) a hydrogenated copolymer block principally comprising an aromatic vinyl monomer unit and a conjugated diene monomer unit; and a content of the aromatic vinyl monomer unit in the (B2) is 20% by weight or more and 95% by weight or less, wherein the content of the aromatic vinyl monomer unit in the component (B) is 35% by weight or more and 80% by weight or less, the ratio of the content (<B>) of the component (B) to the content (<A>) of the component (A) is from 2.71 to 2.95; and wherein a strength at a 100% pull sample according to the tensile measurement (JIS K 6251, pull rate=500 cm/minute) carried out on a sample (thickness=2 mm) of the pellet of flame retardant resin composition is 200 kg/cm$^2$ or less.

6. The pellet of flame retardant resin composition according to claim 5, wherein, the strength at a 100% pull sample according to the tensile measurement (HS K 6251, pull rate=500 cm/minute) carried out on a sample (thickness=2 mm) of the pellet of flame retardant resin composition is 100 kg/cm$^2$ or less.

7. An electric wire coated by a resin composition, comprising components (A), (B), (C) and (D), wherein, based on a total content of components (A), (B), (C) and (D), a content (<A>) of the component (A), which is a polyphenylene ether, 20% by weight or more but less than 21% by weight, a content (<B>) of the component (B), which is a hydrogenated copolymer principally comprising an aromatic vinyl monomer unit and a conjugated diene monomer unit, is 57% by weight or more but 59% by weight or less, a content (<C>) of the component (C), which is a styrene resin and/or olefin resin, is 0% by weight or more but 40% by weight or less, and a content (<D>) of the component (D), which is an aluminum phosphinate is 2% by weight or more but 15% by weight or less, wherein the component (B) comprises (B1) a polymer block principally comprising an aromatic vinyl monomer unit, and (B2) a hydrogenated copolymer block principally comprising an aromatic vinyl monomer unit and a conjugated diene monomer unit; and a content of the aromatic vinyl monomer unit in the (B2) is 20% by weight or more and 95% by weight or less, wherein the content of the aromatic vinyl monomer unit in the component (B) is 35% by weight or more and 80% by weight or less, and the ratio of the content (<B>) of the component (B) to the content (<A>) of the component (A) is from 2.71 to 2.95; and wherein the electric wire coated by the resin composition passes the VW-1 combustion test according to UL1581 and the flame is extinguished within 60 seconds.

8. The electric wire coated by the resin composition according to claim 7, wherein the resin composition further comprises a component (E), which is a phosphorus-based flame retardant other than aluminium phosphinate.

9. The electric wire coated by the resin composition according to claim 8, wherein the resin composition comprises a melamine polyphosphate as the component (E).

10. The electric wire coated by the resin composition according to claim 7, wherein, the electric wire coated by the resin composition passes the VW-1 combustion test according to UL1581 and the flame is extinguished within 30 seconds.

11. The resin composition according to claim 1, wherein the content (<C>) of the component (C) is more than 3% by weight but 40% by weight or less.

12. The pellet of flame retardant resin composition according to claim 5, wherein the content (<C>) of the component (C) is more than 3% by weight but 40% by weight or less.

13. The electric wire coated by the resin composition according to claim 7, wherein the content (<C>) of the component (C) is more than 3% by weight but 40% by weight or less.

* * * * *